United States Patent [19]

Cunningham et al.

[11] Patent Number: 5,447,791
[45] Date of Patent: Sep. 5, 1995

[54] CONDUCTIVE POWDER COATING MATERIALS AND PROCESS FOR THE PREPARATION THEREOF

[75] Inventors: Michael F. Cunningham, Georgetown; Thomas E. Enright, Whitby; Hadi K. Mahabadi, Etobicoke, all of Canada; John G. Van Dusen, Walworth, N.Y.

[73] Assignee: Xerox Corporation, Stamford, Conn.

[21] Appl. No.: 329,348

[22] Filed: Oct. 26, 1994

[51] Int. Cl.$^6$ .......................... B32B 5/16; G03G 5/05; G03G 5/07; H01H 1/12
[52] U.S. Cl. .................... 428/327; 428/323; 428/332; 428/402; 428/409; 428/408; 428/922; 252/502; 252/506; 252/510; 252/511; 252/518; 252/507; 252/509; 252/519; 252/520; 252/521; 430/137; 430/108
[58] Field of Search ............... 252/502, 506, 510, 511, 252/518, 507, 509, 519, 520, 521; 430/137, 138, 108, 109, 111; 428/407, 323, 327, 332, 402, 409, 408, 922

[56] References Cited

U.S. PATENT DOCUMENTS

| | | | |
|---|---|---|---|
| 4,330,460 | 5/1982 | Hoffend et al. | 430/137 X |
| 4,560,635 | 12/1985 | Hoffend et al. | 430/137 X |
| 4,935,326 | 6/1990 | Creatura et al. | 430/108 |
| 4,937,166 | 6/1990 | Creatura et al. | 430/108 |
| 5,164,282 | 11/1992 | Mahabadi | 430/137 X |
| 5,236,629 | 8/1993 | Mahabadi et al. | 430/137 X |
| 5,264,314 | 11/1993 | Mahabadi et al. | 430/137 |
| 5,288,585 | 2/1994 | Mahabadi et al. | 430/137 |
| 5,330,874 | 7/1994 | Mahabadi et al. | 430/137 |

Primary Examiner—Douglas J. McGinty
Attorney, Agent, or Firm—Oliff & Berridge

[57] ABSTRACT

Submicron to micron sized conductive particles, on the order of 0.05 to 5 micron in average particle diameter, are produced using a semisuspension polymerization process in which the aqueous phase of the suspension contains an inorganic salt such as potassium iodide. The inorganic salt inhibits the formation of polymer particles that do not contain conductive filler so as to be non-conductive. The process also allows for conductive filler to be added at the start of the process. Powder coatings made from the submicron sized conductive particles have a high and uniform conductivity.

27 Claims, No Drawings

CONDUCTIVE POWDER COATING MATERIALS AND PROCESS FOR THE PREPARATION THEREOF

FIELD OF THE INVENTION

This invention relates to submicron to micron sized conductive particles for powder coating and a semisuspension polymerization process for producing such particles. The submicron to micron sized conductive particles produced possess a high conductivity that is highly uniform throughout a mixture of such particles.

BACKGROUND OF THE INVENTION

U.S. Pat. No. 5,236,629 to Mahabadi et al., the disclosure of which is totally incorporated herein by reference, discloses a process for making submicron conductive polymeric particles useful as carrier powder coatings by a semisuspension polymerization process. In the semisuspension polymerization process, a mixture of monomers or comonomers, a polymerization initiator, an optional cross-linking agent and an optional chain transfer component are first bulk polymerized to the onset of gel-effect. The onset of gel-effect occurs when about 10 to about 50% of the monomers or comonomers are converted to polymer. Bulk polymerization is then stopped by cooling, and a conductive filler is added to the cooled, partially polymerized product. There is no disclosure or suggestion that the conductive filler can be added at any time other than following bulk polymerization of the monomers or comonomers.

Following addition of the conductive filler to the partially polymerized product, the partially polymerized product containing conductive filler is mixed to form an organic phase which is then suspended in water, with mixing, to form small particles, on the order of 10 microns or less. While still in suspension, polymerization is completed to obtain submicron sized particles, on the order of 0.05 to 1 micron in size, that are conductive.

As discussed in U.S. Pat. No. 5,236,629, the semisuspension process has advantages over other known prior art conductive particle formation processes such as grinding, precipitation and in situ particle polymerization. The advantages include the ability of semisuspension polymerization to yield particles of a small size that have a narrow particle size distribution and also the ability to better distribute the filler throughout the particle's polymer matrix. Semisuspension polymerization is also superior to straight suspension polymerization in allowing for the production of smaller particles that have a controlled size distribution.

However, a drawback to the semisuspension polymerization process when producing submicron particles is the tendency of the process to produce submicron sized particles that do not contain any conductive filler. This tendency is believed to be the result of a competing emulsion polymerization process that occurs in the aqueous phase of the suspension. Generally, both the monomers or comonomers and polymerization initiators are slightly soluble in water. Thus, minor amounts of these materials diffuse into the aqueous phase of the suspension and react to form polymer particles. Because the conductive filler remains in the organic phase of the suspension, these emulsion polymer particles contain no filler and are non-conductive.

When the use being made of the particles requires a high and uniform conductivity, such as is generally required for most conductive powder coatings and particularly for coatings in conductive magnetic brush systems, the presence of any amount of non-conductive particles creates a problem. These particles act as insulators in the powder coating and yield a coating of lesser conductivity than desired and which is also not uniform in conductivity throughout the coating. It would therefore be desirable to achieve a semisuspension process in which non-conductive particles are not produced.

In U.S. Pat. No. 4,330,460 to Hoffend et al., a process for preparing color toner particles by suspension polymerization is disclosed. The suspension polymerization process generally produces toner particles in the size range of about 2 to about 30 microns. The process also produces under-sized, unpigmented polymer particles that create problems in electrostatic transfer of the toner particles and in fusing of the toner particles to the image receiving substrate. Hoffend discloses eliminating the production of such unpigmented polymer particles by adding small amounts, less than 2,000 parts per million based on the weight of the aqueous phase (i.e., less than 0.2 wt.%), of an inorganic salt to the aqueous phase of the suspension. The inorganic salt is disclosed to act as a scavenger which deactivates materials that would polymerize in the aqueous phase. In the suspension polymerization process of Hoffend et al., very small amounts of the inorganic salt had to be used in order to avoid unacceptably inhibiting the formation of polymer particles that contained pigment. The small amounts of inorganic salt added were disclosed by Hoffend et al. to be effective in preventing the formation of unpigmented polymer particles.

In the semisuspension polymerization process, the small amounts of inorganic salts suggested to be added by Hoffend et al. have proven to be ineffective in preventing the formation of non-conductive submicron polymer particles.

SUMMARY OF THE INVENTION

The present invention provides a semisuspension polymerization process which produces submicron to micron sized polymeric particles that uniformly contain conductive filler. The process substantially eliminates the undesired production of non-conductive polymer particles through the use of inorganic salts added to the suspension prior to completing polymerization of the previously bulk polymerized organic phase.

Embodiments of the invention provide for an improved semisuspension polymerization process in which all materials of the organic phase, including the conductive filler, can be added at the start of the bulk polymerization process step.

Embodiments of the present invention allow for the production of improved submicron to micron sized polymer particles capable of achieving high conductivities in that each particle contains conductive filler.

Embodiments of the present invention also allow for the preselection of a conductivity desired of a coating made from the conductive submicron sized polymeric particles and ready achievement of this conductivity through the control of particle size and size distribution provided by the present invention. The conductive submicron sized polymer particles and coatings produced therefrom exhibit high conductivities that are uniform throughout the mixture and the coating.

This invention provides a semisuspension polymerization process for producing conductive submicron to micron sized polymer particles, comprising the steps of:
  (a) partially polymerizing monomers or comonomers, in admixture with at least one polymerization initiator, and optionally with chain transfer agents or crosslinking agents, to a polymer conversion near the onset of gel-effect, with conductive filler being added before, during or after the partial polymerization;
  (b) dispersing the resultant mixture in an aqueous phase to form a suspension;
  (c) adding an inorganic salt to the aqueous phase;
  (d) suspension polymerizing the partially polymerized monomers or comonomers; and
  (e) recovering the submicron to micron sized conductive particles produced.

The semisuspension polymerization process of the present invention is particularly useful for the preparation of conductive-small particles possessing high conductivities. The conductive submicron to micron sized particles may be utilized in conductive powder coatings, for example, for coatings in conductive magnetic brush (CMB) systems.

DETAILED DESCRIPTION OF PREFERRED EMBODIMENTS

The present invention provides a process for the preparation of submicron to micron sized conductive polymer particles, each containing conductive filler or fillers, distributed evenly throughout the polymer matrix of particles, and referred to herein as a semisuspension polymerization process. By "submicron to micron sized" is meant particles having an average particle diameter from less than one micron in diameter to about 5 microns in diameter, in particular particles having an average diameter of from about 0.05 to about 5 micron, preferably 0.1 to 0.8 microns.

In this semisuspension polymerization, a mixture of monomers or comonomers, a polymerization initiator, an optional cross-linking component and an optional chain transfer component is bulk polymerized until the onset of gel-effect is accomplished, for example, when from about 10% to about 50% of monomers or comonomers is converted to polymer. The bulk polymerization is then stopped by cooling the partially polymerized monomers or comonomers.

An advantage of the semisuspension polymerization process of the present invention is that the conductive filler or fillers can be added at the start of, during or after the partial polymerization process. Conventional semisuspension polymerization processes bulk polymerize the monomers or comonomers in the absence of conductive fillers, adding the conductive fillers to the cooled bulk polymerized product followed by mixing with, for example, a high shear homogenizer. Such post-bulk polymerization addition of conductive filler or fillers is more costly than conductive filler addition at the start because of the additional process step and additional equipment required. However, the semisuspension polymerization process of the present invention can alternatively be practiced using the conventional post-bulk polymerization addition of conductive filler or fillers, if desired.

Following cooling of the partially polymerized product, or alternatively if conductive filler or fillers are added after bulk polymerization, following addition and mixing of the conductive filler or fillers, the partially polymerized product with filler(s) is dispersed in an aqueous phase containing a stabilizer component with, for example, a high shear mixer to permit the formation of a suspension containing small, less than 10 microns for example, particles therein.

The aqueous phase of the suspension contains an inorganic salt, preferably a halogen salt, most preferably potassium iodide, which acts to scavenge or deactivate materials in the organic phase of the suspension that diffuse into and react in the aqueous phase. The inorganic salt may be added to the aqueous phase before, while or after the partially polymerized product is added therein.

The amount of inorganic salt added to the aqueous phase should be between 0.25 weight percent and 4.5 weight percent, preferably between 0.25 to 1.25 weight percent, based on the weight of the aqueous phase. An amount of inorganic salt less than 0.25 weight percent does not provide the necessary improvement in conductivity, that is, it does not effectively prevent the emulsion polymerization formation of nonconductive polymer particles that do not contain conductive filler. Amounts greater than 4.5 weight percent result in inhibition of the semisuspension polymerization reaction, leading to incomplete monomer conversion and suspension stability difficulties, producing a mixture of particles that produces a poor carrier coating.

The inventors have surprisingly found that adding larger amounts of an inorganic salt, particularly potassium iodide, to the suspension effectively eliminates the formation of non-conductive polymer particles without any adverse effect upon the formation of conductive submicron polymer particles. While not wishing to be bound by any theory, it is believed that such higher amounts of inorganic salts can be added to the aqueous phase of the suspension in the present process without adversely inhibiting submicron to micron sized conductive particle formation because of an increased tendency for organic phase materials to diffuse into the aqueous phase as the desired particle size to be obtained decreases. Thus, larger amounts of inorganic salts can be added to effectively scavenge the materials causing the undesired emulsion polymerization. However, very high levels of salts can still act to destabilize the suspension in that such excessive amounts can affect properties of the suspension such as interfacial tensions and stabilizer solubility.

It is believed that the function of the inorganic salt is to behave as a scavenger or inactivator for the materials causing polymerization in the aqueous phase of the reaction. It is believed most likely that the chemical constituent causing the aqueous phase emulsion polymerization is the polymerization initiator. The inorganic salt is believed to inhibit or prevent the polymerization initiator from causing reaction of the monomers or comonomers in the aqueous phase, or by terminating growing oligomeric radicals in the aqueous phase. Thus, the undesired aqueous phase emulsion polymerization is prevented.

The inorganic salt can be added to the aqueous phase prior to the addition of the organic phase for suspension. The salt may alternatively be added following suspension of the organic phase, or slowly added such as in increments in a continuous fashion throughout the term of the polymerization reaction. Continuous salt addition has the advantage of maintaining an effective amount of the salt in the aqueous phase throughout the polymerization reaction.

The inorganic salts which are suitable for the prevention of emulsion polymerization in the aqueous phase of the suspension may be selected from the group of inorganic salts derived from an alkali and/or alkaline earth metal, as well as cadmium and/or zinc, and a halogen. The alkali and/or alkaline earth metal may be selected from sodium, potassium, magnesium, calcium, and barium when appropriately soluble in water. The halogen may be selected from fluorine, chlorine, bromine or iodine, with iodine being the preferred halogen. Further, the inorganic salt may be derived from a transition metal such as iron, nickel, chromium, titanium or manganese and a halogen. In addition, these inorganic salts may be employed individually or in mixtures. Most preferably, the inorganic salt is potassium iodide.

Following suspension of the bulk polymerized organic phase containing conductive filler or fillers, the suspension is transferred to a reactor where polymerization is conducted until complete conversion to the submicron to micron sized polymeric conductive particles is achieved. The conductive polymeric particles can then be cooled, washed and dried.

The present semisuspension polymerization process produces submicron to micron sized conductive polymeric particles that each contain from about 1% to about 50% by weight, preferably 10 to 25% by weight, conductive filler distributed throughout the polymer matrix of the particle. The particles can have a number average molecular weight of from between about 5,000 to about 500,000, preferably between 100,000 to about 250,000 and a weight average molecular weight of from between about 10,000 to about 2,000,000, preferably between about 400,000 to about 1,000,000.

Illustrative examples of monomers or comonomers suitable for forming the particle polymer matrix include, but are not limited to vinyl monomers comprised of styrene and its derivatives such as α-methyl styrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methyacrylic acids, methyl methacrylate, ethyl methacrylate, butyl methacrylate, octyl methacrylate, acrylonitrile and acrylamide; dicarboxylic acids having double bonds and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; vinyl ethyl ether; vinyl isobutyl ether; vinyl naphthalene; unsaturated monoolefins such as isobutylene and the like; vinylidene halides such as vinylidene chloride and the like; N-vinyl compounds such as N-vinyl pyrrole and fluorinated monomers such as pentafluorostyrene, alkylpentafluorobenzene and the like; and mixtures thereof. If more than one monomer or comonomer is used, the mixture preferably contains from 2 to 20 monomers or comonomers.

Illustrative examples of polymerization initiators include, but are not limited to, azo compounds such as 2,2'-azodimethylvaleronitrile, 2,2'-azoisobutylonitrile, azobiscyclcohexanenitrile, 2-methylbutronitrile and the like, and peroxide compounds such as benzoyl peroxide, lauryl peroxide, 1,1-(t-butylperoxy)-3,3,5-trimethylcyclohexane, n-butyl-4,4-di-(t-butylperoxy)valerate, dicumyl peroxide and the like.

Cross-linkers that are optionally added to the starting mixture of the present invention are known and can be comprised of compounds having two or more polymerizable double bonds. Examples of such compounds include but are not limited to aromatic divinyl compounds such as divinylbenzene and divinylnaphthalene; carboxylic acid esters having two double bonds such as ethylene glycol diacrylate, ethylene glycol dimethacrylate and the like; divinyl compounds such as divinyl ether, divinyl sulfite, divinyl sulfone and the like. If a cross-linking component is added, it is preferably present in an amount of from about 0.1 to about 5 parts by weight, preferably 0.1 to 1 parts by weight, per 100 parts by weight of monomers or comonomers mixture.

The optional chain transfer components that may be added and which primarily function to control molecular weight by inhibiting chain growth include but are not limited to mercaptans such as laurylmercaptan, butylmercaptan and the like, or halogenated carbons such as carbon tetrachloride or carbon tetrabromide, and the like. If added, the chain transfer agent is preferably present in an amount of from about 0.01 to about 5 weight percent, preferably 0.1 to 1 weight percent, of the monomers or comonomers mixture.

Monomers or comonomers preferably comprise about 50 to about 99 weight percent of the starting mixture. More preferably, the monomers or comonomers comprise 75 to 90 weight percent of the starting mixture. The starting monomers or comonomers mixture also contains a polymerization initiator with the ratio of monomers or comonomers to initiator being from about 100:2 to about 100:20. If a cross-linking component is added, the cross-linking component preferably has a ratio of monomers or comonomers to crosslinking component of from 100:0.1 to about 100:5, and if a chain transfer component is added to the mixture, the ratio of monomers or comonomers to the chain transfer component is from about 100:0.01 to about 100: 1. Preferably, the starting monomers or comonomers mixture also contains conductive filler or fillers in an amount of from about 1 to about 50 weight percent of the starting mixture. If the conductive filler or fillers are added following bulk polymerization, the conductive fillers should be added in an amount of from about 1 to about 50 weight percent of the bulk polymerized product.

Examples of conductive filler or fillers include, but are not limited to conductive carbon blacks such as acetylene black available from Chevron Chemical, Vulcan Black, Black Pearl L, Keytjen Black EC600JD available from Akzo Nobel, Conductex SC Ultra available from Columbian Chemical, metal oxides such as iron oxides, titanium oxide, tin dioxide and metal powders such as iron powder. Preferably, the conductive filler is carbon black.

Bulk polymerization of the monomers or comonomers mixture can be effected by increasing the temperature of the mixture to between about 45° C. to 120° C. until from about 10 to about 50 weight percent of monomers or comonomers has been converted to polymer. The occurrence of partial polymerization is referred to as the onset of gel-effect. The bulk polymerized polymer should have a number average molecular weight of from 5,000 to about 50,000 and a weight average molecular weight of from about 10,000 to about 40,000.

Following cooling, the bulk polymerized organic phase containing conductive fillers is suspended in an aqueous phase by dispersing the organic phase in from about 2 to about 5 times its volume in water containing from about 0.1 to about 5 weight percent of a stabilizing component and about 0.25 to about 4.5 weight percent of an inorganic salt. The suspension should contain small particles following mixing with a high shear mixer.

Stabilizers that are present in an amount of from about 0.1 to about 5 weight percent of the aqueous phase may be selected from both nonionic and ionic water soluble polymeric stabilizers, including but not limited to methyl cellulose, ethyl cellulose, hydroxypropyl cellulose, block copolymers such as Pluronic E87 available from BASF, sodium salt of carboxyl methyl cellulose, polyacrylate acids and their salts, polyvinyl alcohol, gelatins, starches, gums, alginates, zein and casein and the like; and barrier stabilizers such tricalcium phosphate, talc, barium sulphate and the like.

Following suspension, the suspended mixture is preferably transferred to a reactor. Polymerization of the suspension may be effected by increasing the temperature to about 45° C. to about 120° C. until complete conversion of monomers or comonomers to polymer has occurred. By complete conversion is meant that greater than about 97% of the monomers or comonomers are polymerized. Complete conversion should occur in about 3 to about 10 hours. Mixing should be maintained during the polymerization. As discussed above, a continuous stream of the inorganic salt can be added to the reactor during completion of the polymerization process.

The resultant polymerized product is preferably cooled and washed, for example with water and/or an alcohol such as methanol. Washing removes materials remaining on the particle surface such as stabilizers. The washed particles are then separated from the wash liquid, for example by known filtration or centrifugation processes. The particles are then dried such as by vacuum drying, freeze drying, spray drying, fluid bed drying and the like. The resultant polymeric particles have an average size ranging from about 0.05 to about 5 micron, preferably from 0.1 to 0.8 microns. Each particle is highly and uniformly conductive as each particle contains evenly distributed amounts of conductive filler or fillers.

The submicron to micron sized conductive particles produced by the present semisuspension polymerization process are preferably utilized as conductive powder coatings. An advantage of the present semisuspension polymerization process that eliminates the emulsion polymerization production of particles that are non-conductive is the increased control it allows over the selection of physical properties for each conductive particle and for mixtures of such particles. The present semisuspension polymerization process allows for control over the conductivity of the particles due to the ability of the process to control individual particle size and particle size distribution as well as control the amount of conductive filler distributed uniformly in each particles polymer matrix. Also, because undesired non-conductive particles are not produced in the present process, a desired conductivity of an end conductive particle coating made from submicron to micron sized conductive particles of the present invention can be selected and readily achieved through the control over physical properties given by the present process. Selection of the amount of conductive filler to be added to the monomers or comonomers mixture, or to the bulk polymerized mixture, and selection of the conductive filler(s) composition to be capable of achieving the selected conductivity is well within the abilities of one of ordinary skill in the art as disclosed in U.S. Pat. No. 5,236,629, recognizing that as the amount of conductive filler in each particle increases, so does the overall conductivity of the particle and mixture of particles.

Resultant conductive submicron to micron sized particle mixtures and powder coatings made from such mixtures can have high conductivities. For the particle mixture, in which conductivity is discussed in terms of resistivity, the resistivity may be between $10^{-7}$ to $10^0$ ohm-cm, preferably between $10^{-2}$ to $10^0$ ohm-cm. The conductivity is uniform within the mixtures and coatings due to the absence of insulating particles not containing conductive fillers.

The conductive particles may be utilized as conductive powder coatings, for example. Preferably, the particles are used to coat conductive or semiconductive substrates such as metals. Specifically, the conductive submicron to micron sized particles can be used to coat xerographic carrier particles that are used, for example, in conductive magnetic brush (CMB) systems. Examples of carrier particles that can be used include those particles capable of obtaining a triboelectric charge. Illustrative examples of such carrier particles include zircon, silicon, glass, steel, nickel, iron ferrites, silicon dioxide, and the like. Other carrier particles are disclosed in U.S. Pat. Nos. 4,937,166 and 4,935,326, the disclosures of which are totally incorporated herein by reference. Carriers coated with the submicron to micron sized particles may have conductivties between $10^{-12}$ to $10^{-4}$ mho/cm, preferably between $10^{-7}$ to $10^{-5}$ mho/cm.

The following example is submitted to illustrate the invention.

EXAMPLE 125 grams of methyl methacrylate monomer, 7 grams of 2,2'-azobis (2,4-dimethyl valeronitrile), 3.0 grams of benzoyl peroxide and 0.6 gram of divinyl benzene cross-linking agent are mixed in a one liter flask using a mechanical stirrer until dissolved. Seventy five grams of Columbian CONDUCTEX SC ULTRA carbon black is added and stirred until all the carbon black is wetted. This mixture is bulk polymerized by heating in a one liter glass reactor to 50° C. while the mixture is stirred until 12 weight percent of the monomer is converted to polymer. The reactor is then removed from the water bath and cooled to near 0° C. by means of an ice bath. This organic phase is then added to 400 milliliters of water containing 4 weight percent of polyvinyl alcohol having a weight average molecular weight of 3,000, and then mixed at 10,000 rpm for 4 minutes using a Brinkmann PT456G homogenizer. A specified quantity of potassium iodide is then added to the suspension. The suspension is transferred to a 1 liter stainless steel reactor and the temperature is raised from 25 to 60° C. in 35 minutes where it is held for 2 hours, then the temperature is increased to 85° C. in 120 minutes and held there for 1 hour, after which the suspension is cooled in 30 minutes to 25° C. The product is then washed in 1200 grams of methanol. The resulting diluted suspension is centrifuged for 3 minutes at 3,000 RPM. The supernatant liquid comprised of the diluted polyvinyl alcohol is decanted, 1200 g of a mixture of methanol/water (50:50 ratio) is added and the mixture is again centrifuged. This washing procedure is again repeated with deionized water. After the final wash, the product is freeze dried to provide dry individual particles. Using a scanning electron microscope (SEM), photomicrographs of the dry product are taken and indicate that the average particle size of the conductive polymer product is 0.6 micron with a glass transition temperature of 112° C. as measured by DSC. The carbon black content of the product as measured by TGA is 13.6 percent. The product resistivity is measured by melting one gram of product in the form of a film, and using a conductivity meter. Coated carrier is obtained by mixing 0.7 gram of the product with 100 grams of Toniolo core carrier (NRT-125) with an average volume bead diameter of 120 microns in a Munson type mixer at room temperature. The coated materials are then fused on the surface of the carrier at 325° F. in a rotary kiln furnace. The product is sieved through a 177 micron screen to remove coarse materials. Functional evaluation of the resulting carrier is performed in a xerographic test fixture similar to the Xerox Corporation 1075 with a two component development system using red toner, 90 weight percent of styrene butadiene copolymer, 9 percent of LITHOL SCARLET RED and 1 percent of distearyl dimethyl ammonia methyl sulfate. The conductivity of the carrier is determined by forming a 0.1 inch long magnetic brush of the carrier particles, and measuring the conductivity after imposing a 10 volt potential across the brush.

The particles produced in the process are used as a powder coating to coat a carrier substrate. Table 1 contains the results that are obtained for powder coatings made from conductive particles in which the amount of potassium iodide used in the process is varied from zero to 4.5% by weight of the aqueous phase. The coatings are measured for polymer resistivity and carrier conductivity.

TABLE 1

| Expt # | % KI in aqueous phase | Polymer Resistivity (ohm · cm) | Carrier Conductivity (ohm · cm)$^{-1}$ |
|---|---|---|---|
| 1 | 0.00 | 5.5E10 | 2.2E-9 |
| 2 | 0.05 | 8.6E2 | 8.3E-8 |
| 3 | 0.25 | 9.3E1 | 5.9E-8 |
| 4 | 1.25 | 5.0E0 | 1.0E-6 |
| 5 | 4.50 | 4.4E3 | 1.1E-7 |

Results in Table 1 show that as the quantity of potassium iodide in the aqueous phase is increased, the powder conductivity increases significantly (resistivity decreases). Transmission electron micrographs also show that the quantity of small unpigmented particles decreases substantially as the amount of potassium iodide used is increased. Conductivity of the coated carrier also increases as the powder conductivity increases. In order to maximize the conductivity, a concentration of potassium iodide in the aqueous phase of 0.25–1.25% is preferred. Experiment 5 shows that if the potassium iodide concentration is increased too much, conductivity decreases. While it is not known with certainty, it is believed that this is due to deleterious effects of the inorganic salt on the suspension stability.

While this invention has been described in conjunction with specific embodiments thereof, it is evident that many alternatives, modifications, and variations will be apparent to those skilled in the art. Accordingly, it is intended to embrace all such alternatives, modifications and variations as fall within the spirit and scope of the appended claims.

What is claimed is:

1. A process for preparing submicron to micron sized conductive particles, comprising:
    (a) partially polymerizing monomers or comonomers in a pre-mixture with at least one polymerization initiator and optionally with chain transfer or crosslinking agents to a polymer conversion near the onset of gel-effect to form a resultant mixture, with at least one conductive filler being added before, during or after partially polymerizing said monomers or comonomers;
    (b) dispersing the resultant mixture in an aqueous phase to form a suspension, with at least one water soluble salt selected from the group consisting of salts of alkali or alkaline earth metal with iodine or bromine and salts of cadmium, zinc, or transition metals with a halogen being added to said aqueous phase in an amount of from 0.25 wt. % to about 4.5 wt. % based on the weight of the aqueous phase, said at least one salt being added to said aqueous phase before, during or after dispersing said mixture in said aqueous phase;
    (c) suspension polymerizing the partially polymerized monomers or comohomers;
    (d) recovering submicron to micron sized conductive particles produced in step (c).

2. A process according to claim 1, wherein the inorganic salt is added to said aqueous phase prior to dispersing the partially polymerized monomers or comonomers in said aqueous phase.

3. A process according to claim 1, wherein said inorganic salt is added continuously during said suspension polymerization.

4. A process according to claim 1, wherein said inorganic salt is added after suspending said partially polymerized monomers or comonomers in said aqueous phase, but before suspension polymerizing said partially polymerized monomers or comonomers.

5. A process according to claim 1, wherein said at least one inorganic salt is potassium iodide.

6. A process according to claim 2, wherein said at least one inorganic salt is potassium iodide.

7. A process according to claim 3, wherein said at least one inorganic salt is potassium iodide.

8. A process according to claim 4, wherein said at least one inorganic salt is potassium iodide.

9. A process according to claim 1, wherein said inorganic salt is added to said aqueous phase in an amount of from 0.25 wt. % to about 1.25 wt. % based on the weight of the aqueous phase.

10. A process according to claim 1, wherein said at least one conductive filler is carbon black.

11. A process according to claim 1, wherein said submicron to micron sized conductive particles have an average particle diameter ranging from about 0.05 to about 5 microns.

12. A process according to claim 1, wherein said submicron sized conductive particles have an average particle diameter ranging from about 0.1 to about 0.8 microns.

13. A process according to claim 1, wherein said pre-mixture further contains at least one cross-linking agent.

14. A process according to claim 1, wherein said pre-mixture further contains at least one chain transfer agent.

15. A process according to claim 1, wherein said aqueous phase further contains at least one stabilizer.

16. A process according to claim 1, wherein said partial polymerization to the onset of gel-effect occurs at a temperature ranging from 45° C. to 120° C.

17. A process according to claim 1, wherein said suspension polymerization occurs at a temperature ranging from 45° C. to 120° C.

18. A process according to claim 1, wherein said at least one conductive filler is added before partially polymerizing said monomers or comonomers.

19. A process according to claim 1, wherein said at least one conductive filler is added while partially polymerizing said monomers or comonomers.

20. A process according to claim 1, wherein said at least one conductive filler is added after partially polymerizing said monomers or comonomers.

21. A mixture of submicron to micron sized conductive particles, said mixture comprising polymer particles having an average particle diameter ranging from 0.05 to 5 microns and containing conductive filler and being substantially free of polymer particles not containing said conductive filler, said mixture having a uniform resistivity of between $10^{-7}$ to $10^0$ ohm-cm;

wherein said mixture of submicron to micron sized conductive particles is made by a process comprising (a) partially polymerizing monomers or comonomers in a pre-mixture with at least one polymerization initiator and optionally with chain transfer or crosslinking agents to a polymer conversion near the onset of gel-effect to form a resultant mixture, with at least one conductive filler being added before, during or after partially polymerizing said monomers or comonomers;

(b) dispersing the resultant mixture in an aqueous phase to form a suspension, with at least one water soluble salt selected from the group consisting of salts of alkali or alkaline earth metal with iodine or bromine and salts of cadmium, zinc, or transition metals with a halogen being added to said aqueous phase in an amount of from 0.25 wt. % to about 4.5 wt. % based on the weight of the aqueous phase, said at least one salt being added to said aqueous phase before during or after dispersing said mixture in said aqueous phase;

(c) suspension polymerizing the partially polymerized monomers or comonomers; and (d) recovering said submicron to micron sized conductive particles produced in step (c).

22. A process for preparing submicron to micron sized conductive particles, comprising:

(a) partially polymerizing monomers or comohomers in a pre-mixture with at least one polymerization initiator and optionally with chain transfer or crosslinking agents to a polymer conversion near the onset of gel-effect to form a resultant mixture, with at least one conductive filler being added before or while partially polymerizing said monomers or comonomers;

(b) dispersing the resultant mixture in an aqueous phase to form a suspension, with at least one water soluble salt selected from the group consisting of salts of alkali or alkaline earth metal with iodine or bromine and salts of cadmium, zinc, or transition metals with a halogen being added to said aqueous phase in an amount of from 0.25 wt. % to about 4.5 wt. % based on the weight of the aqueous phase, said at least one salt being added to said aqueous phase before, during or after dispersing said mixture in said aqueous phase;

(c) suspension polymerizing the partially polymerized monomers or comonomers; and (d) recovering submicron to micron sized conductive particles produced in step (c).

23. A mixture of submicron to micron sized conductive particles according to claim 21, wherein said particles have an average particle diameter ranging from 0.1 to 0.8 microns.

24. A process according to claim 1, wherein said pre-mixture contains about 50 to about 99 wt. % monomers or comonomers; said resultant mixture is dispersed in about 2 to about 5 times the mixtures volume in the aqueous phase; and said submicron to micron sized conductive particles recovered each contain from about 1% to about 50% by weight conductive filler.

25. A coated substrate, comprising a substrate in a conductive coating over substrate, said conductive coating comprising a mixture of submicron to micron sized polymer particles containing a conductive filler and said mixture being substantially free of polymer particles not containing said conductive filler, and said coated substrate possessing uniform conductivity values ranging between $10^{-12}$ to $10^{-4}$ mho/cm; wherein said coated substrate is made in a process comprising (a) partially polymerizing monomers or comonomers in a pre-mixture with at least one polymerization initiator and optionally with chain transfer or crosslinking agents to a polymer conversion near the onset of gel-effect to form a resultant mixture, with at least one conductive filler being added before, during or after partially polymerizing said monomers or comonomers;

(b) dispersing the resultant mixture in an aqueous phase to form a suspension, with at least one water soluble salt selected from the group consisting of salts of alkali or alkaline earth metal with iodine or bromine and salts of cadmium, zinc, or transition metals with a halogen being added to said aqueous phase in an amount of from 0.25 wt. % to about 4.5 wt. % based on the weight of the aqueous phase, said at least one salt being added to said aqueous phase before, during or after dispersing said mixture in said aqueous phase;

(c) suspension polymerizing the partially polymerized monomers or comonomers; and (d) recovering said submicron to micron sized conductive particles produced in step (c); and (e) coating a mixture of said submicron to micron sized polymer particles over said substrate.

26. A coated substrate according to claim 25, wherein said substrate is a carrier particle for a xerographic developer.

27. A process according to claim 1, wherein said at least one water soluble salt is a reducing or oxidizing agent.

* * * * *